US010935799B2

(12) United States Patent
Meyer Timmerman Thijssen et al.

(10) Patent No.: US 10,935,799 B2
(45) Date of Patent: Mar. 2, 2021

(54) OPTICAL COMPONENT HAVING DEPTH MODULATED ANGLED GRATINGS AND METHOD OF FORMATION

(71) Applicant: APPLIED Materials, Inc., Santa Clara, CA (US)

(72) Inventors: Rutger Meyer Timmerman Thijssen, Sunnyvale, CA (US); Ludovic Godet, Boston, MA (US); Morgan Evans, Manchester, MA (US); Joseph C. Olson, Beverly, MA (US)

(73) Assignee: Applied Materials, Inc., Santa Clara, CA (US)

( * ) Notice: Subject to any disclaimer, the term of this patent is extended or adjusted under 35 U.S.C. 154(b) by 58 days.

(21) Appl. No.: 16/168,185

(22) Filed: Oct. 23, 2018

(65) Prior Publication Data
US 2020/0124865 A1   Apr. 23, 2020

(51) Int. Cl.
*G02B 5/18* (2006.01)
*G02B 27/09* (2006.01)
*G02B 27/01* (2006.01)

(52) U.S. Cl.
CPC ....... *G02B 27/0944* (2013.01); *G02B 5/1819* (2013.01); *G02B 27/0172* (2013.01); *G02B 2027/0178* (2013.01)

(58) Field of Classification Search
CPC ............ G02B 27/0172; G02B 27/0944; G02B 5/1857; G02B 5/1809; G02B 5/1819; G02B 2027/0174; G02B 2027/0178

(Continued)

(56) References Cited

U.S. PATENT DOCUMENTS 5,982,545 A * 11/1999 Su ................ G02B 5/1857
   359/566
6,545,808 B1 * 4/2003 Ehbets ................ G02B 5/1857
   359/15

(Continued)

FOREIGN PATENT DOCUMENTS

KR   20170037980 A   4/2017
WO   2016048729 A1   3/2016
WO   2018067500 A1   4/2018

OTHER PUBLICATIONS

International Search Report and Written Opinion dated Jan. 3, 2020 for PCT/US2019/051646 filed Sep. 18, 2019.

(Continued)

*Primary Examiner* — Audrey Y Chang
(74) *Attorney, Agent, or Firm* — Kacvinsky Daisak Bluni PLLC

(57) ABSTRACT

A method of forming an optical grating component. The method may include providing a substrate, the substrate comprising an underlayer and a hard mask layer, disposed on the underlayer. The method may include patterning the hard mask layer to define a grating field and etching the underlayer within the grating field to define a variable height of the underlayer along a first direction, the first direction being parallel to a plane of the substrate. The method may include forming an optical grating within the grating field using an angled ion etch, the optical grating comprising a plurality of angled structures, disposed at a non-zero angle of inclination with respect to a perpendicular to a plane of the substrate, wherein the plurality of angled structures define a variable depth along the first direction, based upon the variable height of the underlayer.

15 Claims, 11 Drawing Sheets

(58) Field of Classification Search
USPC ............... 359/575, 576, 566, 569; 216/24
See application file for complete search history.

(56) References Cited

U.S. PATENT DOCUMENTS

| | | | |
|---|---|---|---|
| 2009/0268295 A1* | 10/2009 | Miller .................. | G02B 1/11 359/576 |
| 2011/0038049 A1* | 2/2011 | Vallius ................ | G02B 5/1809 359/575 |
| 2016/0033784 A1* | 2/2016 | Levola ................ | G02B 6/0058 385/37 |
| 2016/0116739 A1 | 4/2016 | Tekolste et al. | |
| 2018/0052277 A1* | 2/2018 | Schowengerdt ....... | G02C 11/10 |
| 2019/0018186 A1* | 1/2019 | Fattal .................. | G02B 6/0038 |
| 2019/0258008 A1* | 8/2019 | Hautala ............... | G02B 6/34 |

OTHER PUBLICATIONS

"Diffractive optics for virtual reality displays", Author: Tapani Levola, Society for Information Display 1071-0922/06/1405-0467; Journal of the SID 14/5, 2006; pp. 467-475.

* cited by examiner

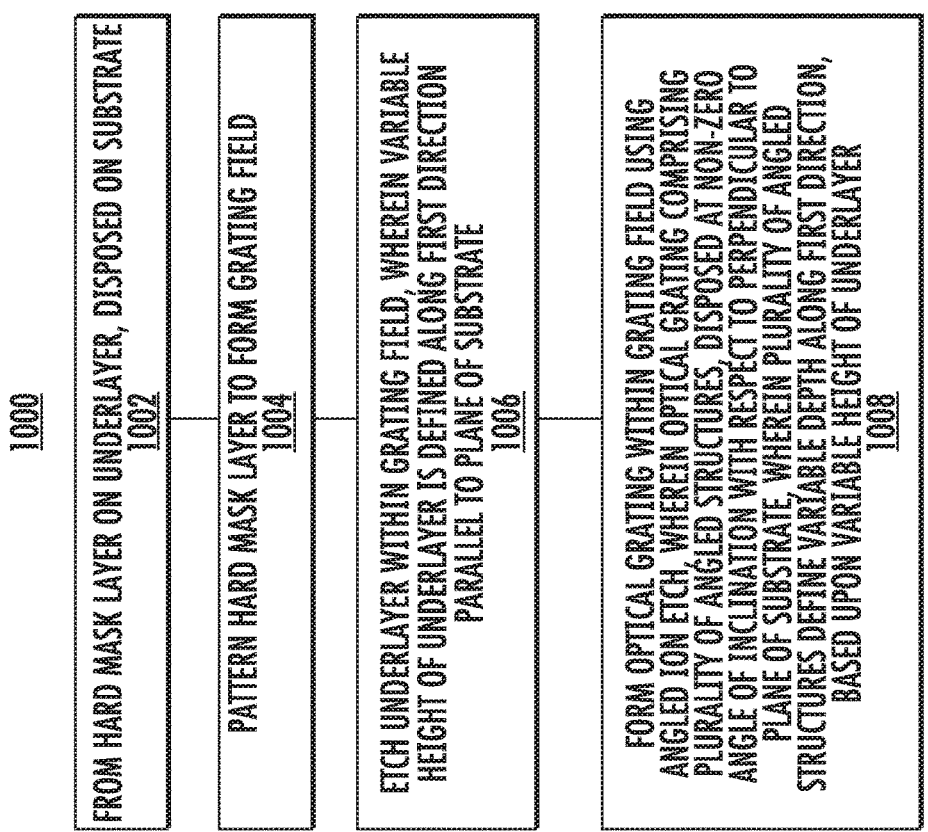
FIG. 10
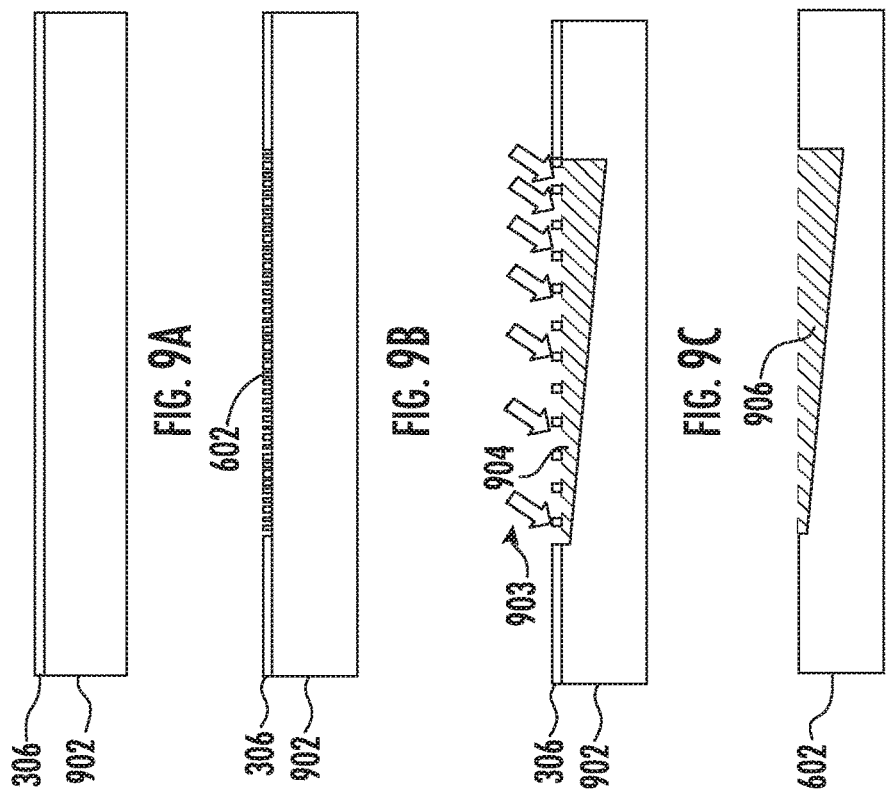
FIG. 9A
FIG. 9B
FIG. 9C
FIG. 9D

OPTICAL COMPONENT HAVING DEPTH MODULATED ANGLED GRATINGS AND METHOD OF FORMATION

FIELD

This disclosure relates to optical elements, and more particularly to approaches for forming variable gratings in optical lenses.

BACKGROUND

Optical lenses have long been used to manipulate light for various advantages. Recently, micro-diffraction gratings have been utilized in holographic and augmented/virtual reality (AR & VR) devices.

One particular AR & VR device is a wearable display system such as a headset, which headset is arranged to display an image within a short distance from a human eye. Such wearable headsets are sometimes referred to as head mounted displays, and are provided with a frame displaying an image within a few centimeters of the user's eyes. The image can be a computer generated image on a display, such as a micro display. The optical components are arranged to transport light of the desired image, where the light is generated on the display to the user's eye to make the image visible to the user. The display where the image is generated can form part of a light engine, where the image itself generates collimated light beams, which beams can be guided by the optical component to provide an image visible to the user.

Different kinds of optical components have been used to convey the image from the display to the human eye. To properly function in an augmented reality lens, the height (thickness) of an optical grating is designed to vary as a function of distance of propagation of the light across the lens. In known devices, multiple different regions, such as two or three different regions, are formed on the surface of a lens, where the grating height in one region is different from the grating height in other regions. To provide these different regions, different etches are used to etch the gratings in different regions so the height of the gratings may differ among the different regions. Within a given region, the grating height is uniform, while the grating height changes abruptly at the border between one region and an adjacent region. In addition to increasing processing complexity, the resulting augmented reality lenses provide a blockiness over different regions of a lens, where the height of the gratings increases in a discontinuous fashion between one region and an adjacent region. This blockiness may lead to decreased image clarity and resolution.

Therefore, with respect to at least the above considerations the present disclosure is provided.

BRIEF SUMMARY

In one embodiment, a method of forming an optical grating component is provided. The method may include providing a substrate, the substrate comprising an underlayer and a hard mask layer, disposed on the underlayer. The method may include patterning the hard mask layer to define a grating field and etching the underlayer within the grating field to define a variable height of the underlayer along a first direction, the first direction being parallel to a plane of the substrate. The method may include forming an optical grating within the grating field using an angled ion etch, the optical grating comprising a plurality of angled structures, disposed at a non-zero angle of inclination with respect to a perpendicular to a plane of the substrate, wherein the plurality of angled structures define a variable depth along the first direction, based upon the variable height of the underlayer.

In another embodiment, an optical grating component is provided. The optical grating component may include a substrate base, and a grating layer, disposed on the substrate base. The grating layer may include a grating field, wherein the grating field comprises an array of angled structures. The plurality of angled structures may have a pitch of less than one micrometer, disposed at a non-zero angle of inclination with respect to a perpendicular to a plane of the substrate base, having a variable depth along the first direction, and defining a grating surface, parallel to a plane of the substrate base.

In another embodiment, a method of forming an optical grating component, may include providing a substrate, the substrate comprising a silicon nitride underlayer and a hard mask layer, disposed on the silicon nitride underlayer. The method may include patterning the hard mask layer to define a grating field and etching the silicon nitride underlayer within the grating field to define a variable height of the underlayer along a first direction, the first direction being parallel to a plane of the substrate. The method may include forming an optical grating within the grating field using an angled ion etch. The optical grating may include a plurality of angled structures, disposed at a non-zero angle of inclination with respect to a perpendicular to a plane of the substrate, wherein the plurality of angled structures define a variable depth along the first direction, based upon the variable height of the underlayer.

BRIEF DESCRIPTION OF THE DRAWINGS

The accompanying drawings illustrate exemplary approaches of the disclosure, including the practical application of the principles thereof, as follows:

FIG. 9A to FIG. 9D depict various stages in fabrication of yet another optical grating component according to further embodiments of the disclosure; and FIG. 10 depicts a process flow in accordance with embodiments of the disclosure.

Figure 1A:
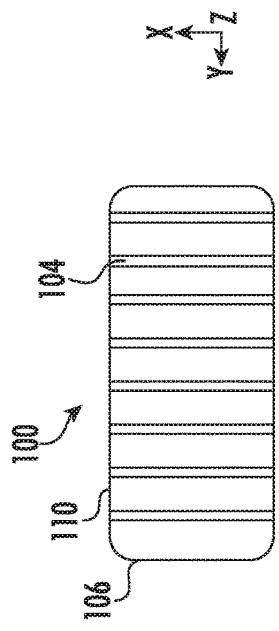
FIG. 1A depicts a side cross sectional view of an optical grating component, according to embodiments of the disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

As used herein, an element or operation recited in the singular and proceeded with the word "a" or "an" are understood as possibly including plural elements or operations, except as otherwise indicated. Furthermore, references to "one embodiment" or "some embodiments" of the present disclosure may be interpreted as including the existence of additional embodiments also incorporating the recited features.

Embodiments herein provide novel optical components and systems and methods for forming an optical component. Various embodiments are related to optical grating components, where the term "optical grating component" refers to a device or part including an optical grating, including AR & VR headsets, eyepieces for AR & VR, or masters for forming optical gratings for eyepieces such as eyeglasses.

Figure 1B:
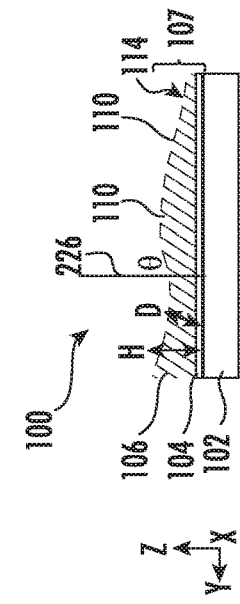
FIG. 1B depicts a top plan view of the optical grating component of FIG. 1A.

FIG. 1A depicts a side cross sectional view of an optical grating component 100, according to embodiments of the disclosure. FIG. 1B depicts a top plan view of the optical grating component 100. The optical grating component 100 may be used as an optical grating to be placed on an eyeglass or formed integrally in the eyeglass in accordance with various embodiments of the disclosure. The optical grating component 100 includes a substrate 102, and optical grating 106, disposed on the substrate 102. In some embodiments, the substrate 102 is an optically transparent material, such as a known glass. The embodiments are not limited in this context. The optical grating 106 may be disposed in a grating layer 107, as described further below. In the embodiment of FIG. 1A and FIG. 1B, the optical grating component 100 further includes etch stop layer 104, disposed between the substrate 102 and grating layer 107. According to some embodiments of the disclosure, the grating layer 107 may be an optically transparent material, such as silicon oxide, silicon nitride, glass, or other material.

According to some embodiments of the disclosure, the optical grating 106 may comprise a grating height H in the range of 100 nm to 1000 nm. As, such the optical grating 106 may be appropriate for use in an eyepiece of a AR & VR apparatus. The embodiments are not limited in this context. In accordance with some embodiments, the etch stop layer 104 may be an optically transparent material and may have a thickness of 10 nm to 100 nm. The embodiments are not limited in this context. Examples of a suitable material for etch stop layer 104 include SiN, $SiO_2$, TiN, SiC, TiCN, and other materials. In embodiments where the optical grating 106 is to be applied to or incorporated in an eyepiece of an eyeglass, an especially appropriate material is an optically transparent material, including materials where refractive index matches to other layers to reduce of minimize reflection. In embodiments where the optical grating component 100 forms a master for fabricating optical gratings for an eyepiece, the etch stop layer 104 need not be optically transparent. Moreover, the etch stop layer 104 may be omitted in some embodiments.

As further shown in FIG. 1A, the optical grating 106 may comprise a plurality of angled structures, shown as angled structures 110, disposed at a non-zero angle of inclination (θ), with respect to a perpendicular 226 to a plane of the substrate 102, wherein the angled structures 110 are arranged to define a variable height along a first direction. In the example of FIG. 1A, the angled structures 110 are separated by trenches 114 and define a variable height along the direction parallel to the Y-axis of the Cartesian coordinate system shown, where the first direction (Y-Axis) is parallel to the plane of the substrate 102, in this case the X-Y plane. A hallmark of the optical grating 106 is a smooth variation in grating height H along the first direction, i.e., along the "Y-direction." In various embodiments, the variation in grating height H or variation in grating depth d may be on the order of 10%, 20%, or 30%, 50%, or 70%, 90% or 100% across the width direction (Y-direction) from left to right in FIG. 1A. Notably, the width of the optical grating 106 along the Y-direction may be on the order of several millimeters to several centimeters, while the grating height H may be on the order of 1 micrometer or less. Accordingly, the variation in grating height H may range on the order of several hundred nanometers or less. The embodiments are not limited in this context.

One effect of the smooth variation in grating height H is to improve performance of an augmented reality glasses by improving the guiding of light from a light source across the surface of an eyepiece, where the smooth variation in grating height H generates a better distribution of light, and better augmented reality image.

Turning again to FIG. 1B, there is shown a 2-dimensional representation of the optical grating 106 in top plan view, where the optical grating 106 may have an area on the order of a few square centimeters. As illustrated, the angled structures 110 may extend along a second direction (X-direction), such as perpendicular to the Y-direction. According to some embodiments, the grating height H may be uniform along the X-direction, meaning the grating height H may vary smoothly along the Y-direction, while being constant along the X direction, for a given angled structure 110. In this respect, the pitch of the angled structures 110 in the optical grating 106 may be on the order of the wavelength of visible light, meaning the optical grating 106 may include tens of thousands of angled structures 110. Thus, the variation in height along the Y-direction within a single angled structure, meaning an angled structure 110, may be negligible.

Figure 1C:
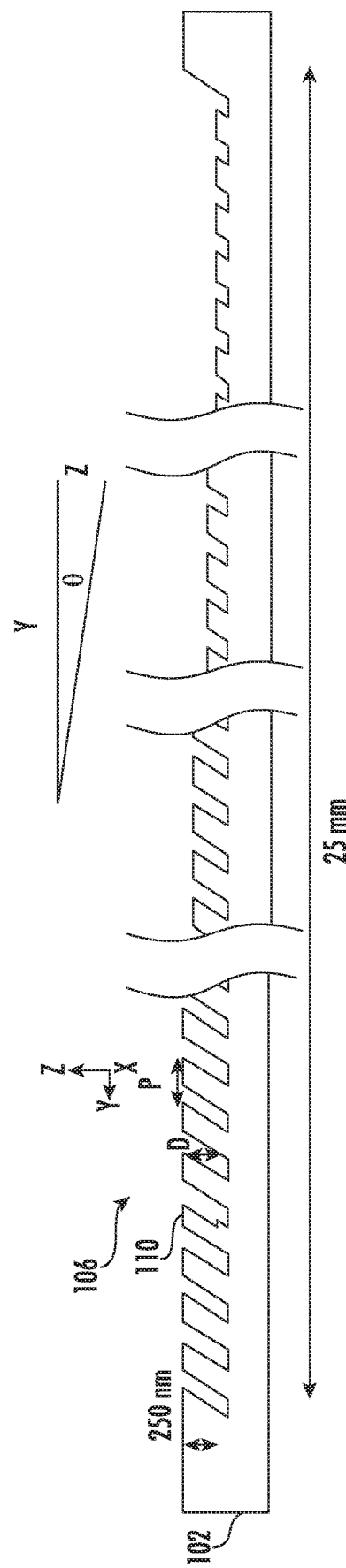
FIG. 1C depicts details of the geometry of a side cross sectional view of an optical grating component, according to embodiments of the disclosure

FIG. 1C depicts details of the geometry of a side cross sectional view of an optical grating component 100, according to embodiments of the disclosure. In various embodiments angled structures 110 may have a maximum height or maximum depth in some regions of 100 nm to 500 nm. The embodiments are not limited in this context. One example of a maximum depth is 250 nm. The angled structures may have a width along the Y-axis on the order of 100 nm to 500 nm, with a pitch p on the order of 200 nm to 750 nm. The embodiments are not limited in this context. As shown in FIG. 1C, the depth D of angled structures 110 may gradually change across the optical grating 106, over a distance of 25 mm, for example (the dimensions shown in FIG. 1C are merely exemplary, for the purposes of illustration). The view of FIG. 1C illustrates 4 different segments of an optical grating 106, separated from one another by several millimeters or more. Thus, many thousands of individual angled structures may be disposed between the different segments shown in FIG. 1C. The depth D may decrease in one example from 250 nm to 80 nm across the optical grating 106. In an example of a linear decrease, assuming a pitch p of 325 nm, and a width of optical grating 106 of 25 mm along the Y-axis. The total change in depth between adjacent structures (assuming zero height at the end of a grating) may be 0.00325 nm or 3.3 picometers, essentially no measurable change. Thus, the angle ϑ formed by changes in height along a grating may be less than 0.01 degrees, meaning locally, across the width of an angled structure, or between adjacent angled structures, the optical grating 106 is effectively flat.

Figure 2A:
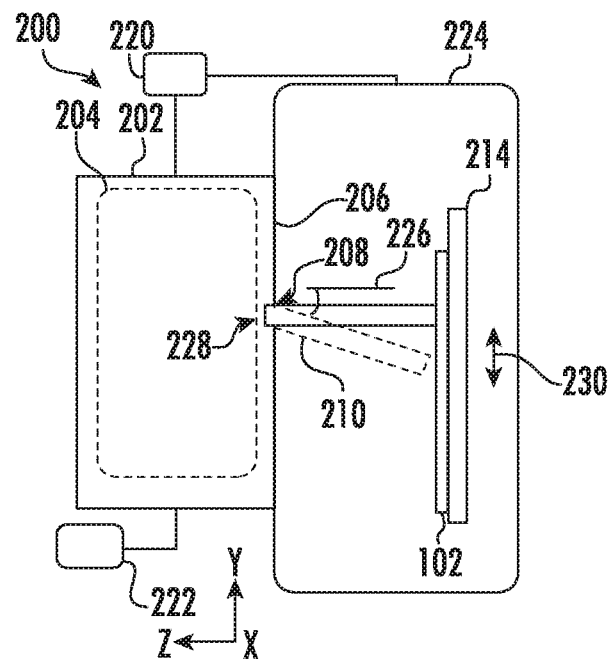
FIG. 2A shows a processing apparatus, depicted in schematic form, in accordance with embodiments of the present disclosure.

Turning now to FIG. 2A, there is shown a processing apparatus 200, depicted in schematic form. The processing apparatus 200 represents a processing apparatus for etching portions of a substrate, or depositing on a substrate, to generate, for example, the optical gratings of the present embodiments. The processing apparatus 200 may be a plasma based processing system having a plasma chamber 202 for generating a plasma 204 therein by any convenient method as known in the art. An extraction plate 206 may be provided as shown, having an extraction aperture 208, where a non-uniform etching or non-uniform deposition may be performed to reactively etch or deposit a grating layer 107. A substrate 102, including, for example, the aforementioned optical grating structure, is disposed in the process chamber 224. A substrate plane of the substrate 102 is represented by the X-Y plane of the Cartesian coordinate system shown, while a perpendicular to the plane of the substrate 102 lies along the Z-axis (Z-direction).

As further shown in FIG. 2A, an ion beam 210 may be extracted when a voltage difference is applied using bias supply 220 between the plasma chamber 202 and substrate 102, or substrate platen 214, as in known systems. The bias supply 220 may be coupled to the process chamber 224, for example, where the process chamber 224 and substrate 102 are held at the same potential.

According to various embodiments, the ion beam 210 may be extracted along the perpendicular 226 or may be extracted at a non-zero angle of incidence, shown as θ, with respect to the perpendicular 226.

The trajectories of ions within the ion beam 210 may be mutually parallel to one another or may lie within a narrow angular range, such as within 10 degrees of one another or less. Thus, the value of θ may represent an average value of incidence angle where the individually trajectories vary up to several degrees from the average value. In various embodiments, the ion beam 210 may be extracted as a continuous beam or as a pulsed ion beam as in known systems. For example, the bias supply 220 may be configured to supply a voltage difference between plasma chamber 202 and process chamber 224, as a pulsed DC voltage, where the voltage, pulse frequency, and duty cycle of the pulsed voltage may be independently adjusted from one another.

In various embodiments, gas, such as a chemically reactive gas, may be supplied by the source 222 to plasma chamber 202. The plasma 204 may generate various etching species or depositing species, depending upon the exact composition of species provided to the plasma chamber 202.

Figure 2B:
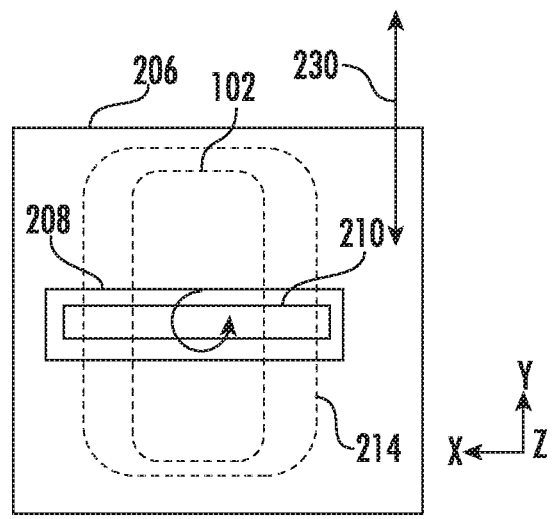
FIG. 2B shows an extraction plate component and substrate in top plan view in accordance with embodiments of the present disclosure.

In various embodiments, the ion beam 210 may be provided as a ribbon ion beam having a long axis extending along the X-direction of the Cartesian coordinate system shown in FIG. 2B. By scanning a substrate platen 214 including substrate 102 with respect to the extraction aperture 208, and thus with respect to the ion beam 210 along the scan direction 230, the ion beam 210 may etch the substrate 102 or deposit upon the substrate 102. The ion beam 210 may be composed of any convenient gas mixture, including inert gas, reactive gas, and may be provided in conjunction with other gaseous species in some embodiments. In particular embodiments, the ion beam 210 and other reactive species may be provided as an etch recipe to the substrate 102 so as to perform a directed reactive ion etching of a layer, such as the grating layer 107. Such an etch recipe may use known reactive ion etch chemistries for etching materials such as oxide or other material, as known in the art. In other embodiments, the ion beam 210 may be formed of inert species where the ion beam 210 is provided to etch the substrate 102 or more particularly, the grating layer 107, by physical sputtering, as the substrate 102 is scanned with respect to ion beam 210.

In this example of FIG. 2B, the ion beam 210 is provided as a ribbon ion beam extending to a beam width along the X-direction, where the beam width is adequate to expose an entire width of the substrate 102, even at the widest part along the X-direction. Exemplary beam widths may be in the range of 10 cm, 20 cm, 30 cm, or more while exemplary beam lengths along the Y-direction may be in the range of 2 mm, 3 mm, 5 mm, 10 mm, or 20 mm. The embodiments are not limited in this context.

Notably, the scan direction 230 may represent the scanning of substrate 102 in two opposing (180 degrees) directions along the Y-direction, or just a scan toward the left or a scan toward the right. As shown in FIG. 2B, the long axis of ion beam 210 extends along the X-direction, perpendicularly to the scan direction 230. Accordingly, an entirety of the substrate 102 may be exposed to the ion beam 310 when scanning of the substrate 102 takes place along a scan direction 230 to an adequate length from a left side to right side of substrate 102, as shown in FIG. 2B.

In various embodiments, as detailed below, the processing apparatus 200 may be used to form a non-uniform grating layer, having a variable grating height, as shown above with respect to FIG. 1A. This variable grating height may be accomplished by scanning the substrate 102 with respect to the ion beam 210 using a selected area processing (SAP) recipe. In brief, a SAP scan recipe may entail varying at least one process parameter of a set of process parameters during scanning of the substrate 102. Possible effects of selective area processing include changing the etch rate, deposition rate, implantation dose or degree of amorphization caused by the ion beam 210, as a function of different locations on the substrate 102. In particular, "selective area processing" or "SAP" may refer to the operation of scanning a substrate with respect to an ion beam to expose different portions of the substrate to an ion beam in sequential fashion, where at least one parameter, such as the scan rate of the substrate or the duty cycle of a pulsed ion beam, is varied while scanning the substrate.

Such process parameters may include the scan rate of the substrate 102, the ion energy of the ion beam 210, duty cycle of the ion beam 210 when provided as a pulsed ion beam, and rotational position of the substrate 102. The embodiments are not limited in this context. Because the deposition rate or etch rate caused by the ion beam 210 varies during scanning of the substrate 102, the thickness or height of the grating layer 107 may vary along the scan direction (Y-axis), generating (after further process operations, detailed below) the resultant structure as shown in FIG. 1A.

In the figures to follow, various embodiments are illustrated for formation of an optical grating component. A common feature of these embodiments is the use of patterning and non-uniform etching applied to a hard mask layer and an underlayer to define an optical grating. In particular, a grating field is defined in a substrate where the optical grating is to be formed and the underlayer is etched in a manner defining a variable height within the underlayer along a given direction parallel to the substrate plane. The optical grating is formed by using an angled reactive ion etch (or angled RIE (ARIE)) to define a plurality of angled structures. As detailed below, the angled structures, in turn, define a variable depth mimicking the variable height of the underlayer. As shown in the figures to follow, in some examples, the angled structures of the optical grating are formed directly within the underlayer, while in other examples the angled structures are formed in a planarization layer formed over the underlayer.

Figure 3A:
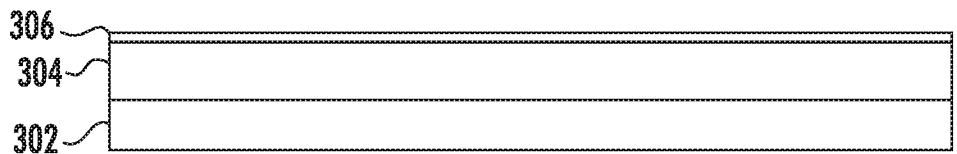
FIG. 3A-FIG. 3J depict various stages in fabrication of an optical grating component according to some embodiments of the disclosure.
Figure 3B:
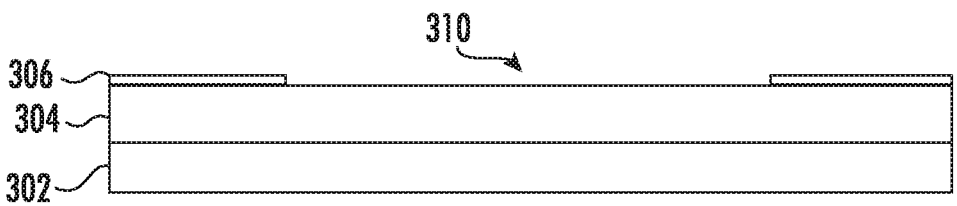
Figure 3C:
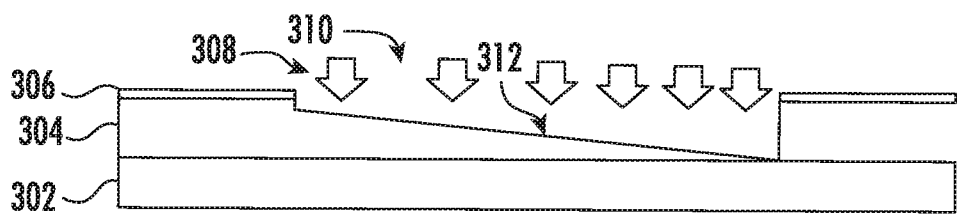
Figure 3D:
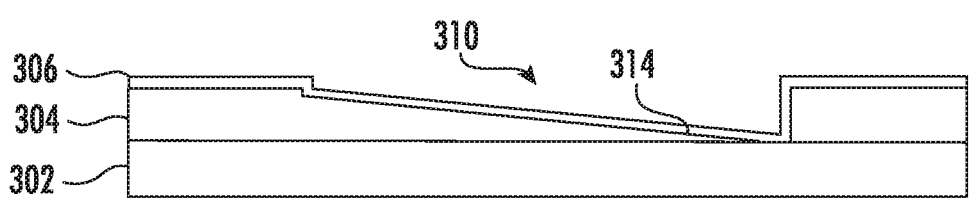
Figure 3E:
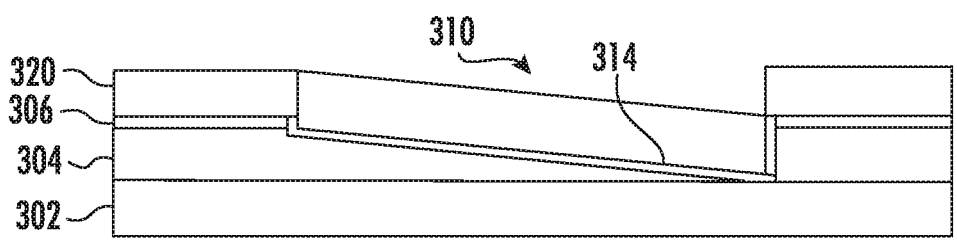
Figure 3F:
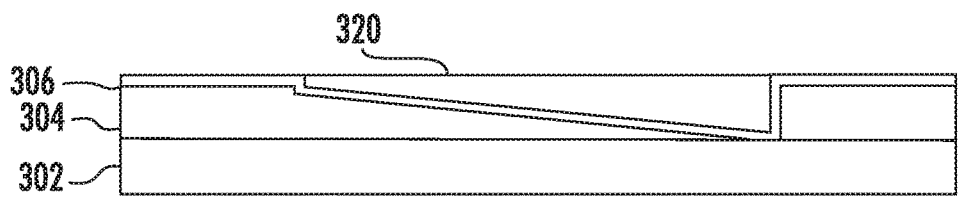
Figure 3G:
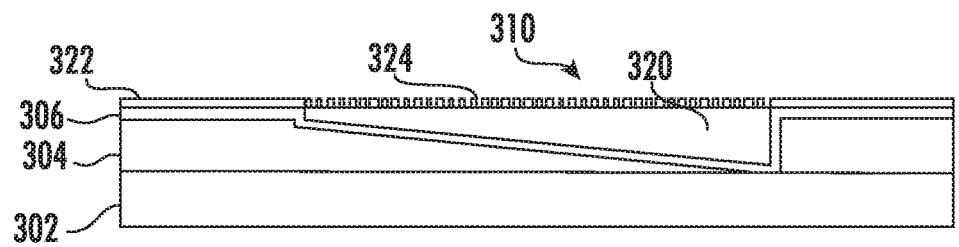
Figure 3H:
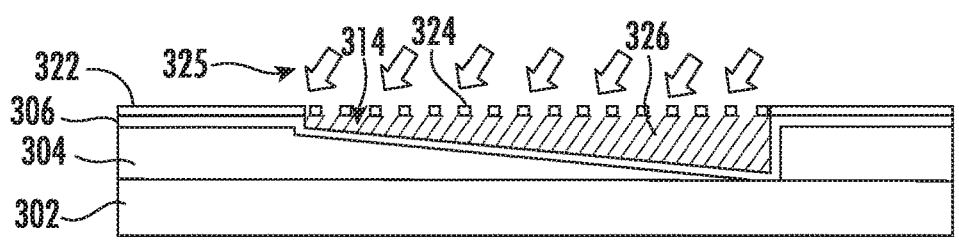
Figure 3I:
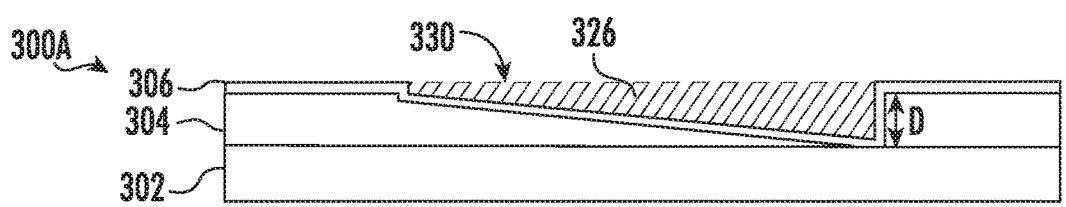
Figure 3J:
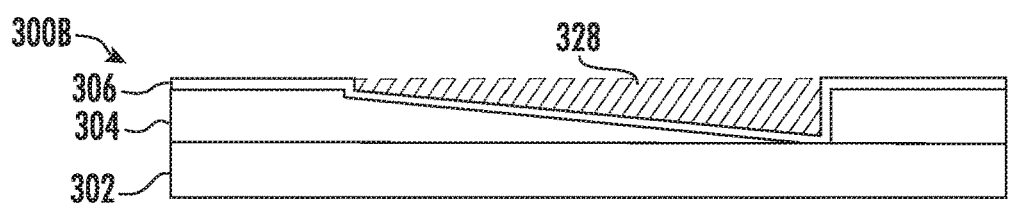

Turning now to FIGS. 3A-3J there is shown a side cross-sectional view of an optical grating component at different instances during fabrication, according to embodiments of the disclosure. FIG. 3I shows one variant, optical grating component 300A, while FIG. 3J shows another variant, optical grating component 300B. According to some embodiments, the optical grating components may be used as masters for forming optical gratings to be applied to lenses in AR & VR hardware. In other embodiments, the optical grating components may be directly applied to lenses. Thus, the exact materials to be used for substrate bases as well as optical grating layers may vary depending upon the application of the optical grating component, as will be readily appreciated by those of skill in the art.

At FIG. 3A, a substrate is provided including a substrate base 302, underlayer 304, disposed on the substrate base 302, and hard mask layer 306, disposed on the underlayer 304. In various non-limiting embodiments, the underlayer 304 may be silicon nitride, such as $Si_3N_4$, while the hard mask layer 306 is silicon dioxide ($SiO_2$). Notably, the material of hard mask layer 306 may differ from the material of underlayer 304, facilitating the use of underlayer 304 as an etch stop during patterning of hard mask layer 306.

Exemplary thickness of underlayer 304 ranges between 100 nm and 1000 nm, depending upon the height of optical gratings to be formed. Exemplary thickness of hard mask layer 306 may be any suitable thickness given that at least a portion of the hard mask layer 306 is to be preserved after etching of the underlayer 304. Thus, to the extent the underlayer 304 may be subject to a selective etch for etching the underlayer 304 faster than the hard mask layer 306, the hard mask layer 306 thickness may be less than or equal to the underlayer 304 thickness in some embodiments.

Turning to FIG. 3B, there is shown a subsequent instance after patterning the hard mask layer 306 to define a grating field 310. As such, the underlayer 304 is exposed in the grating field 310. The patterning may be accomplished by known methods, including contact printing, photolithography, or other methods. For example, a photoresist layer may be applied, followed by a contact lithography process to define the grating field 310, an etch operation to etch the hard mask layer 306, and a strip operation to remove the photoresist.

The grating field 310 may have the designed shape for an optical grating within the X-Y plane of the Cartesian coordinate system shown. For example, the grating field 310 may have a rectangular shape, a trapezoidal shape, or other shape, such as known shapes used for optical gratings in AR & VR hardware. As such, the dimensions of the grating field 310 along the X-axis or Y-axis may be on the order of millimeters or centimeters.

In FIG. 3C, there is shown a subsequent instance where the underlayer 304 is subjected to selective area processing using etching ions 308. The etching ions 308 may be provided as part of a known reactive ion etching (RIE) recipe, appropriate to selectively etch the underlayer 304 with respect to the hard mask layer 306.

The etching ions 308 may be provided as a ribbon beam as discussed above, where the ribbon beam is elongated along the X-axis, while the substrate base 302 is scanned along the Y-axis, equivalent to the scan direction 230. According to the present embodiments, the degree of etching of the underlayer 304 caused by etching ions 308 may be varied along the scan direction 230 by varying any combination of the aforementioned parameters. For example, the scan rate of the substrate platen 214 may be varied as the substrate base 102 is scanned under an ion beam containing the etching ions 308. In some embodiments where the width of an ion beam along the Y-axis is 1 mm to 3 mm, for example, the width of the optical grating 106 along the Y-axis may be 2 cm. Accordingly, a non-uniform etch profile may be introduced into the grating layer 107 by adjusting the scan rate of the narrow (1 mm wide) ion beam during scanning across the 2-cm width of the optical grating 106.

In another embodiment, the etching ions 308 may be provided in a pulsed ion beam, where the duty cycle of the pulsed ion beam is varied while the substrate base 102 is scanned along the Y-axis. Notably, known pulsed supplies may pulse ion beams at frequencies in the kHz range, meaning the duty cycle can be adjusted over periods of milliseconds or less. Accordingly, for a scan rate of the substrate 102 on the order of millimeters per second, the duty cycle may be adjusted many thousands of times during scanning across a 2-cm optical grating, for example. Thus, the effective etch rate of the etching ions 308 may be finely tailored along the Y-axis.

According to some embodiments of the disclosure, a designed or theoretical grating height profile for a given optical grating may be calculated to optimize performance of the optical grating. This grating height profile may then be used to program and SAP recipe for the processing apparatus 200 to generate the profile in the underlayer 304 using etching ions 308. For clarity, FIG. 3C illustrates an example where the underlayer 304 is etched to generate a linearly decreasing thickness from left to right. The etching ions 308 may or may not etch through an entirety of the underlayer 304 toward the deepest part. Thus, the relative intensity of etching increases linearly as the substrate base 302 is scanned, so more etching takes place in regions to the right in the figure. As a result, the upper surface 312 of the underlayer 304 slopes downwardly to the right. Notably, the drawing of FIG. 3C is not to scale. Thus, as discussed with respect to FIG. 1C, the upper surface 312 may define an angle with respect to the X-Y plane of less than 0.01 degrees, and in some cases less than 0.001 degrees.

At FIG. 3D a subsequent operation is shown where an etch stop layer 314 is applied to the underlayer 304. Application may take place using chemical vapor deposition (CVD), atomic layer deposition (ALD), or other technique. In the example where underlayer 304 is silicon nitride, the etch stop layer 314 may be TiN, TaN, or silicon oxide. The embodiments are not limited in this context.

At FIG. 3E a backfill layer 320 is deposited on the etch stop layer 314. The backfill layer 320 may be deposited in a blanket deposition, covering the substrate on regions outside of the grating field 310. The backfill layer 320 may be silicon nitride in some embodiments.

At FIG. 3F, the backfill layer 320 is planarized. As such, backfill layer 320 may be removed from regions over the hard mask layer 306, and may define a planar surface, parallel to the X-Y plane. Planarization may take place using selective area processing in some cases, where an ion beam is directed to the substrate while the substrate base is scanned.

At FIG. 3G another hard mask layer is deposited, shown as hard mask layer 322. The hard mask layer 322 is then patterned in the grating field 310 to define a grating structure 324, acting as a grating mask. The hard mask layer 322 may be patterned by known techniques, as discussed above. As such, the grating structure 324 may define the size and shape (within the X-Y plane) of structures in an optical grating to be formed in the backfill layer 320. In various embodiments where the width of angled structures to be formed is less than 500 nm, deep ultraviolet lithography may be used to define the grating structure 324 in the hardmask layer 322.

At FIG. 3H, an angled ion etch is performed to direct angled ions 325 to the grating structure 324. The angled ions 325 may be provided as an angled ion beam in a RIE etch recipe to selectively etch the backfill layer 320 with respect to the hard mask layer 322. This selective etching results in the formation of angled structures 326 in the backfill layer 320. The angled ions 325 may be provided at a designed angle of incidence to generate an appropriate angle of inclination in the angled structures 326.

In accordance with various embodiments, a directional angled reactive ion etch (including location-specific intensity variation), represented by angled ions 325, may include other non-ionic species, and may be chosen according to known reactive ion etch compositions for selectively etching the backfill layer 320. For example, the etch chemistry (such as $CH_3F$ or $CHF_3$) may be chosen to selectively etch $Si_3N_4$ with respect to $SiO_2$ in one example. Returning to FIG. 2A and FIG. 2B, the angled ions 325 may be provided as a ribbon ion beam, with the ion trajectories of the ribbon ion beam defining a non-zero angle of inclination θ with respect to the perpendicular 226, (the Z-axis of FIG. 3H) as shown. The non-zero angle of incidence may be generated according to known techniques, such as using a beam blocker (not shown) adjacent the extraction aperture 208, adjusting the extraction aperture width along the Y-axis, as well adjusting plasma conditions within the plasma 204, including gas pressure, so as to change the curvature of the plasma sheath boundary 228, proximate the extraction aperture 208. Notably, the etch stop layer 314 prevents etching of underlayer 304. For example, using known RIE chemistry, the backfill layer 320 may be etched 10 times to 100 times more rapidly than etch stop layer 314. Thus, the backfill layer 320 may be etched to different depths at different regions of the grating field 310, while not removing the etch stop layer 314. While in some embodiments, the etching of the backfill layer 320 may be uniform, in other embodiments, a selective area processing operation may be applied to perform the operation of FIG. 3H, where the scan rate or duty cycle is varied while scanning the substrate with respect to angled ions 325, as generally described above. In this manner, exposure to etching ions in shallower portions of the backfill layer 320 may be reduced, ensuring the etch stop layer 314 is not removed, and accordingly generating the designed depth for the angle structures 326.

At FIG. 3I, the hard mask layer is selectively removed, leaving the optical grating component 300A. As such, the optical grating component 300A may include many thousands or tens of thousands of angled structures 326, where the angled structures 326 define a variable depth along a given direction, in this case along a first direction parallel to the Y-axis. Notably, the variable depth, D, of the angled structures 326, is a direct result of the variable height of the underlayer 304. Said differently, the depth of the angled structures 326 increases as the height of the underlayer decreases along the Y-axis. A related feature of the optical grating component 300A is the upper surface 330, where the upper surface is parallel to the X-Y plane, and thus the grating structures 326 generally form a mirror image in cross-section to the underlayer 304 in the grating field 310.

At FIG. 3J, the optional operation is shown where the depositing of a coating, such as an oxide coating, is performed. This operation results in the formation of coated angled structures 328, forming the optical grating component 300B. This operation may be useful to enable nanoimprint lithography where the optical grating component 300B is to be used as a master to form optical gratings. In other applications, this operation may be suitable to chemically stabilize (hermetically seal) material in layer 320, when the material of layer 320 is a polymer or other soft material.

Turning now to FIGS. 4A-4J there is shown a side cross-sectional view of an optical grating component at different instances during fabrication, according to further embodiments of the disclosure. By way of comparison to the sequence of FIGS. 3A-3J, this approach does not employ the extra planarization operation of FIG. 3F, while entailing additional lithography operations.

Figure 4A:
FIG. 4A-FIG. 4J depict various stages in fabrication of another optical grating component according to some embodiments of the disclosure.

At FIG. 4A, a substrate is provided including the substrate base 302, as well as underlayer 304, disposed above the substrate base 302, and hard mask layer 306, disposed on the underlayer 304. In this embodiment, an etch stop layer 402 is disposed between the underlayer 304 and the substrate base 302. In various non-limiting embodiments, the material of etch stop layer 402 may differ from the material of underlayer 304 facilitating the use of etch stop layer 402 as an etch stop during patterning of underlayer 304. The etch stop layer 402 may be, for example, TiN or TaN, and may be deposited by chemical vapor deposition in some embodiments.

Figure 4B:
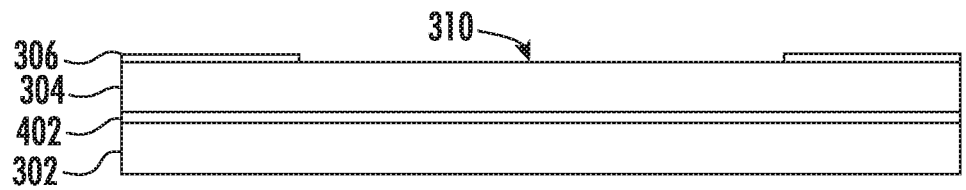

Turning to FIG. 4B, there is shown a subsequent instance after deposition of the hard mask layer 306 and subsequent patterning to define a grating field 310, generally as described above with respect to FIG. 3B. As such, the underlayer 304 is exposed in the grating field 310.

Figure 4C:
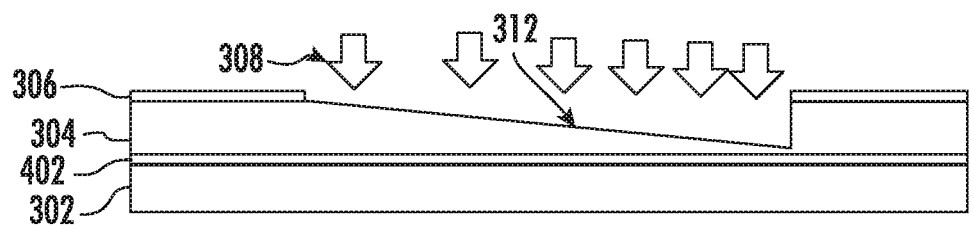

In FIG. 4C, there is shown a subsequent instance where the underlayer 304 is subjected to selective area processing using etching ions 308, as described above with respect to FIG. 3C. The etching ions 308 may or may not etch through an entirety of the underlayer 304 toward the deepest part.

Figure 4D:
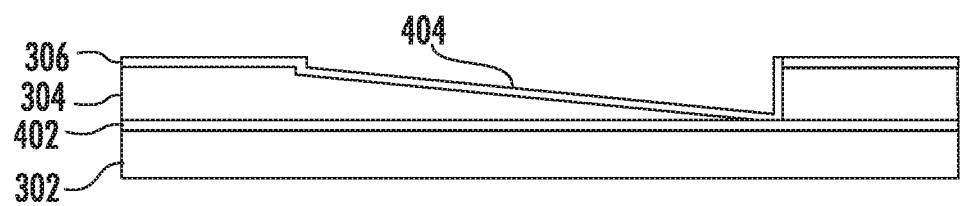

At FIG. 4D a subsequent operation is shown where another etch stop layer shown as etch stop layer 404, is applied to the underlayer 304. Application may take place using chemical vapor deposition (CVD), atomic layer deposition (ALD), or other technique. In the example where underlayer 304 is silicon nitride, the etch stop layer 404 may be TiN, TaN, or silicon oxide. The embodiments are not limited in this context. As detailed below, the configuration of FIG. 4D may be employed, wherein the etch stop layer 402 acts as a lower etch stop layer, and the etch stop layer 404 acts as an upper etch stop layer.

Figure 4E:
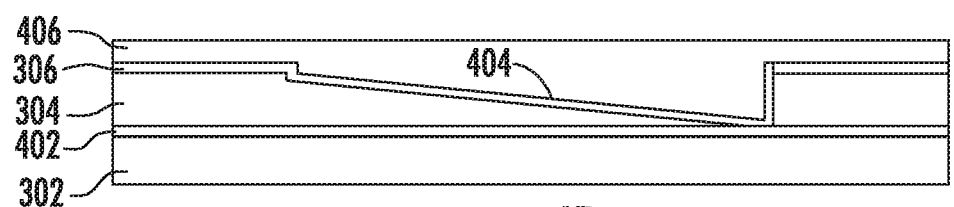

At FIG. 4E an optical proximity layer 406 is deposited on the etch stop layer 404. The optical proximity layer 406 may be deposited in a blanket deposition, covering the substrate on regions outside of the grating field 310. The optical proximity layer 406 may be silicon nitride in some embodiments.

Figure 4F:
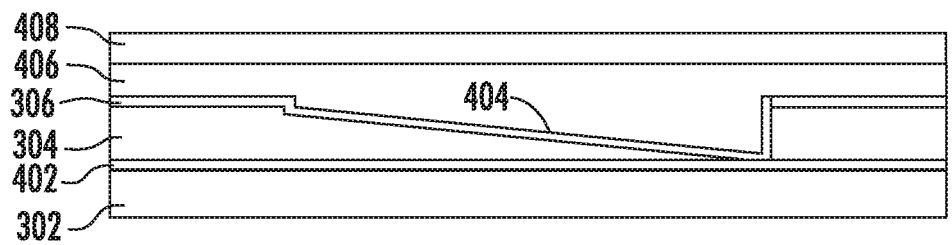
Figure 4G:
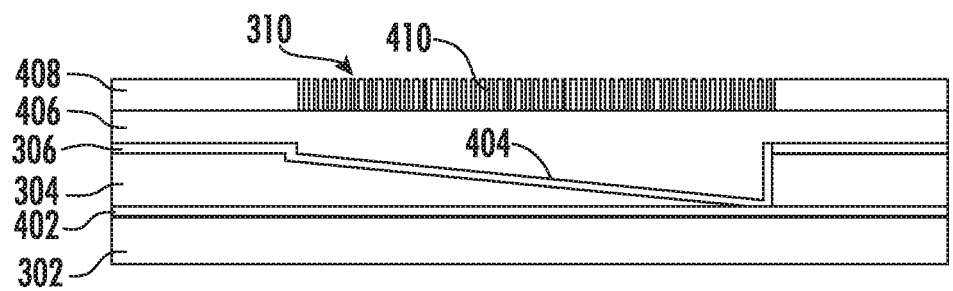

At FIG. 4F, a photoresist layer 408 is deposited on the structure of FIG. 4E. At FIG. 4G, in a subsequent operation, a grating pattern 410 is formed in the photoresist layer 408, in the grating field 310. The grating pattern 410 may be formed using known lithography techniques, such as deep ultraviolet lithography.

Figure 4H:
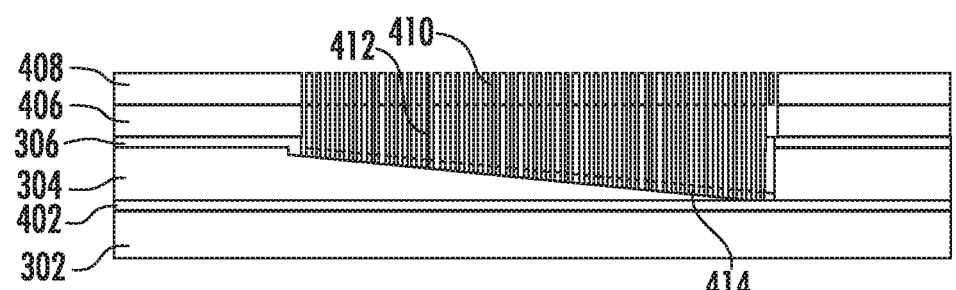

At the stage shown in FIG. 4H, in a subsequent series of operations, the grating pattern 410 is transferred into the optical proximity layer 406, forming the grating pattern 412, and then transferred into the etch stop layer 404, forming the grating structure 414. The transfer operations to form the grating structure 414 may involve directional etching, such as known reactive ion etching processes.

Figure 4I:
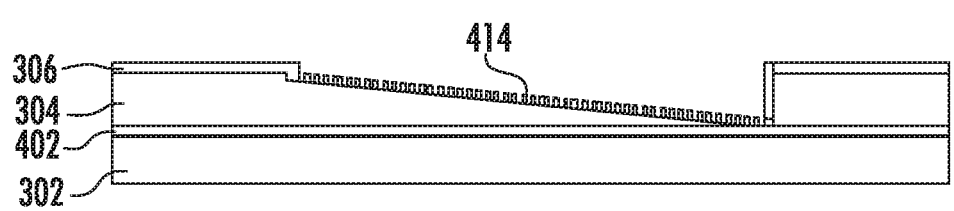

At FIG. 4I, there is shown a subsequent instance, after stripping of the optical proximity layer 406 and photoresist layer 408 has been performed. The stripping of these layers may be performed in a selective matter according to known processes to selectively remove optical proximity layer 406 and photoresist layer 408, while not etching the grating structure 414. As such, the grating structure 414 may be similar to the grating structure 324, described above. A notable difference in grating structure 414 is the grating structure 414 is disposed along the upper surface 312, and thus on a surface where the height of the underlayer 304, disposed under the grating structure 414, varies within the grating field 310.

Figure 4J:
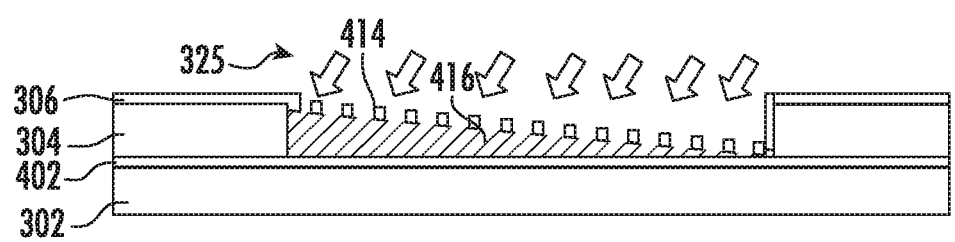

At FIG. 4J, an angled ion etch is performed to direct angled ions 325 to the grating structure 414. The angled ions 325 may be provided as described above with respect to the various embodiments of FIG. 3H. This selective etching results in the formation of angled structures 416 in the underlayer 304. The angled ions 325 may be provided at a designed angle of incidence to generate an appropriate angle of inclination in the angled structures 416. While not shown, the grating structure 414 may be selectively removed, leaving an optical grating formed from the angled structures 416.

By way of comparison, when the same selective area processing operation is used in the operations of FIG. 3C and FIG. 4C, the angled structures 416 may be considered a mirror image of the angled structures 326, where the X-Y plane acts as the mirror plane.

Figure 5A:
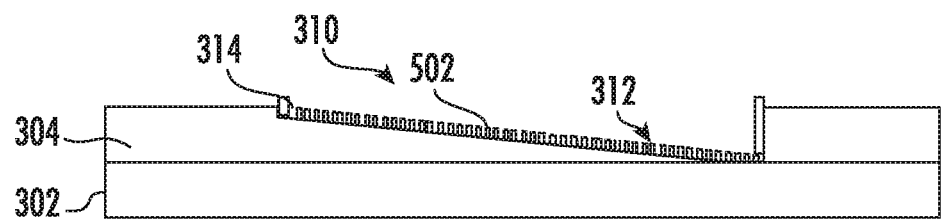
FIG. 5A to FIG. 5C depict various stages in fabrication of another optical grating component according to some embodiments of the disclosure.

In additional embodiments of the disclosure, a structure similar to the structure of FIG. 4J may be formed according to a shorter sequence of operations. Turning now to FIG. 5A, there is shown an initial operation, according to a different sequence subsequent to the operations depicted in FIGS. 3A-3D. In this variant, the etch stop layer 314 is patterned to form a grating structure 502, where the grating structure 502 lies along the upper surface 312. Because the grating structure 502 may be a different material from the underlayer 304, the grating structure 502 may be used as a mask to form an optical grating in the underlayer 304, as noted above. Notably, in patterning to form the grating structure 502, the hard mask layer 306 may be removed from regions outside of the grating field 310.

Figure 5B:
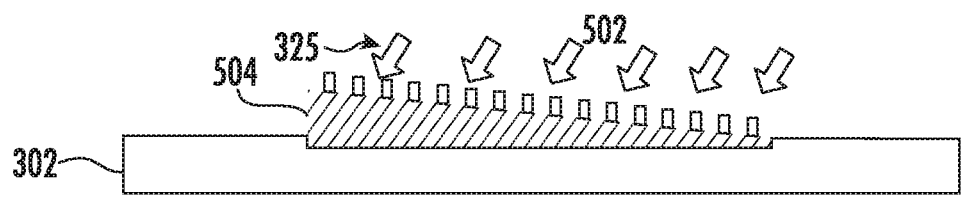

At FIG. 5B, an angled ion etch is performed using the angled ions 325, forming the angled structures 504. At FIG. 5C, the grating structure 502 may be selectively removed.

Notably, the substrate base 302 may be a different material from underlayer 304, where etch rate of the substrate base 302 is less than the etch rate of the underlayer 304, prevents etching of underlayer 304. Thus, the underlayer 304 may be etched to different depths at different regions of the grating field 310, while not substantially etching the substrate base 302. In other embodiments, a selective area processing operation may be applied to perform the operation of FIG. 5B, where the scan rate or duty cycle is varied while scanning the substrate with respect to angled ions 325, as generally described above. In this manner, exposure to etching ions in less tall portions (to the right in FIG. 5C) of the underlayer 304 may be reduced, ensuring the substrate base 302 is not etched to a larger extent than in regions to the left, where the underlayer 304 is taller. The resulting optical grating may be similar to the optical grating formed after the operation of FIG. 4J, save the absence of underlayer 304, outside of the grating field 310.

In additional embodiments of the disclosure, angled structures may be generated before a variable depth or variable height is generated in an optical grating. By way of comparison to approaches where variable height is generated firstly, in these additional embodiments, the bottom of angled structures may be more well defined, while the tops of the angled structures may be not as well shaped.

Figure 6A:
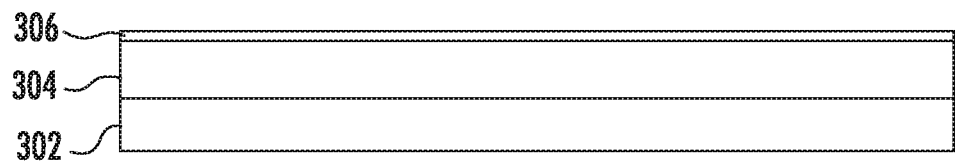
FIG. 6A to FIG. 6D depict various stages in fabrication of another optical grating component according to further embodiments of the disclosure.
Figure 6B:
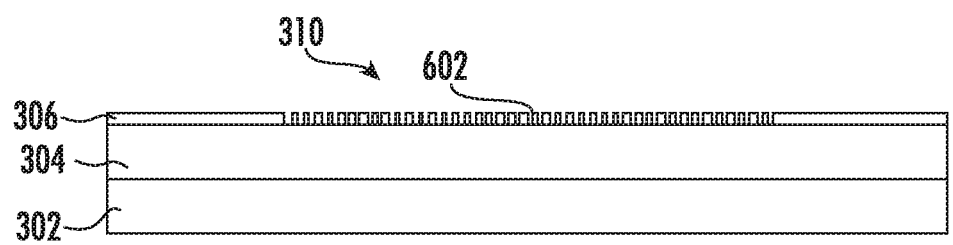
Figure 6C:
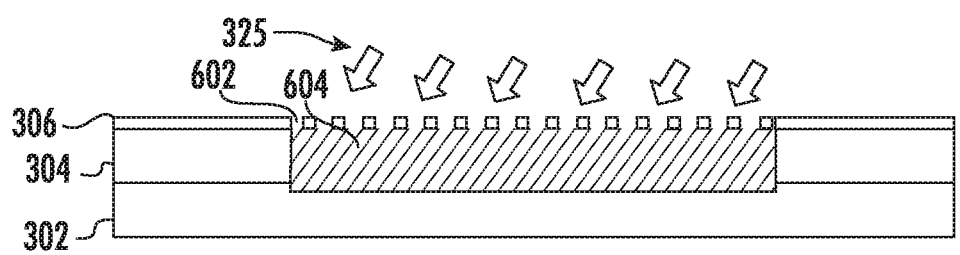
Figure 6D:
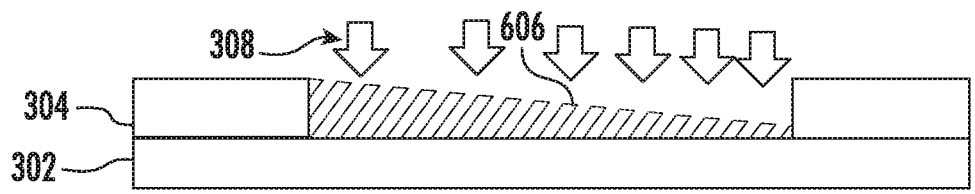

Turning to FIG. 6A, there is shown a structure similar to or the same as the structure of FIG. 3A. In FIG. 6B, the structure of FIG. 6A is etched to form a planar grating structure, also defining at the same time the grating field 310. The planar grating structure, shown as grating structure 602, may define a similar pattern to the grating structure 324 or the grating structure 414, or the grating structure 502, for example. At FIG. 6C, angled ions 325 are directed to the grating structure 602, according to the operations described above, forming the angled structures 604. Notably, the angled structures 604 at this stage define a uniform depth or uniform thickness across the grating field 310. At FIG. 6D the etching ions 308 are used to perform a non-uniform etch, as described above. As a result, an optical grating 606 is formed, having a variable height or variable depth along the Y-axis.

Figure 5C:
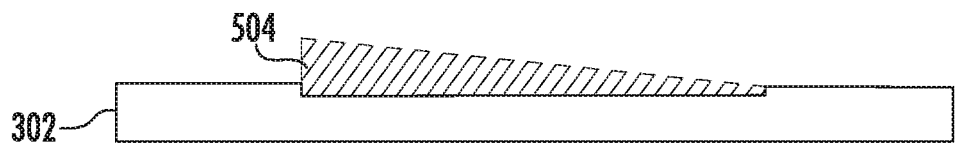
Figure 7A:
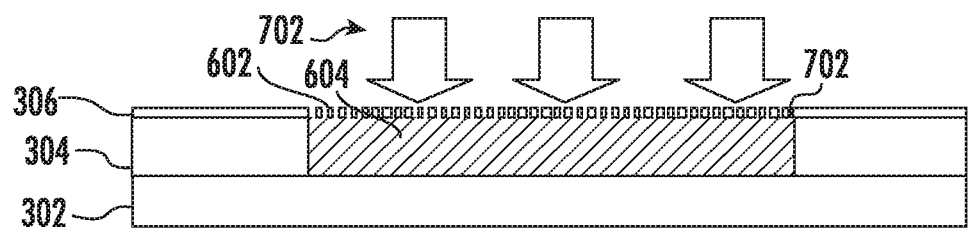
FIG. 7A to FIG. 7C depict various stages in fabrication of still another optical grating component according to other embodiments of the disclosure.
Figure 7B:
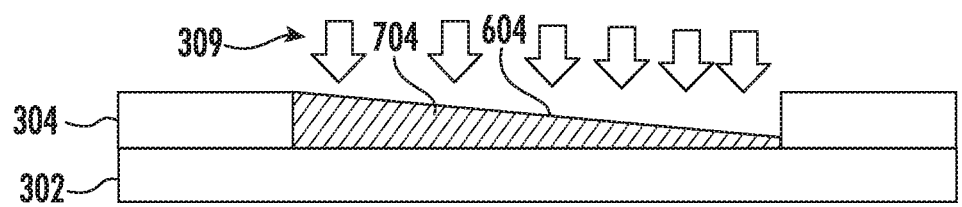
Figure 7C:
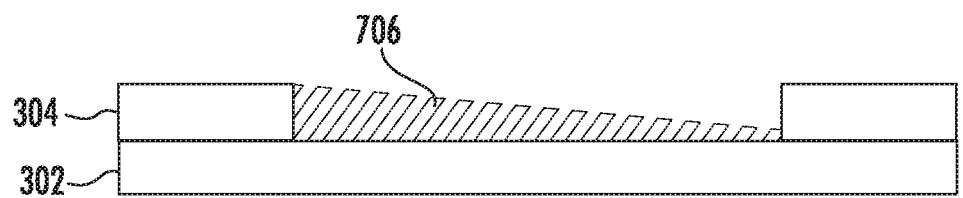

In one variant of the embodiment of FIGS. 5A-5D, after the operation of FIG. 5C, a backfill material 702 may be filled between the angled structures 604, as shown in FIG. 7A. A non-uniform etching operation may subsequently be performed with the backfill material 702 in place, forming the optical grating structure 704, as shown in FIG. 7B. In some embodiments, the backfill material 702 may be removed, resulting in the optical grating 706, shown in FIG. 7C.

Figure 8A:
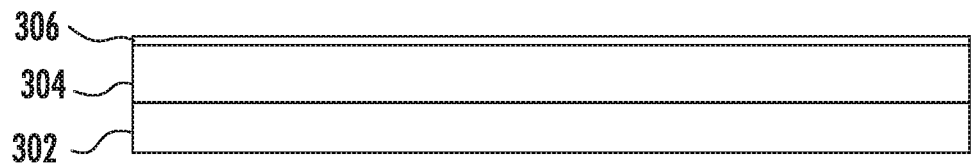
FIG. 8A to FIG. 8D depict various stages in fabrication of a further optical grating component according to further embodiments of the disclosure.
Figure 8B:
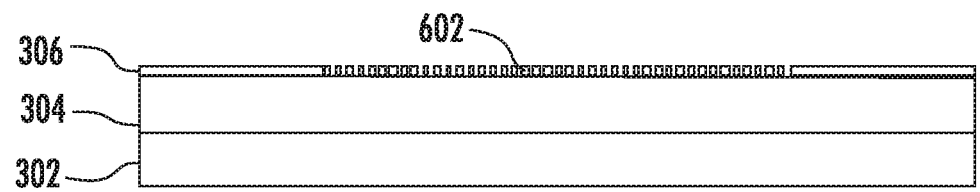
Figure 8C:
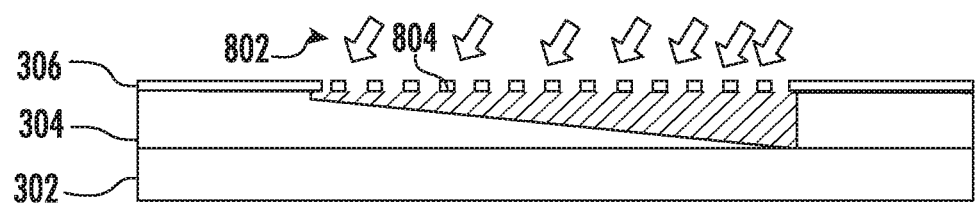
Figure 8D:
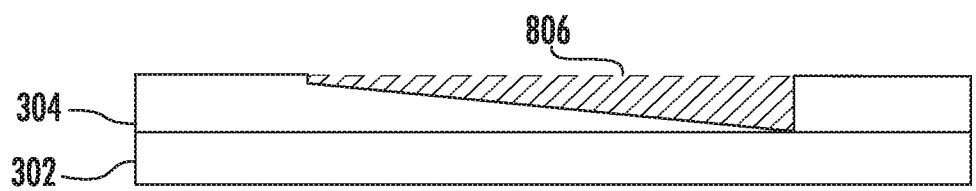

In still further embodiments of the disclosure, formation of an optical grating may be accomplished wherein the etching an underlayer and the forming of an optical grating are performed simultaneously in one operation. Turning to FIG. 8A, and FIG. 8B, there is shown formation of structures similar to or the same as the structures of FIGS. 6A and 6B. In FIG. 8C, angled ions 802 are directed to the grating structure 602, where the angled ions 802 are directed at a non-zero angle of incidence with respect to a perpendicular (Z-axis). As such, grating structures 804 are formed, being disposed at a non-zero angle of inclination with respect to the perpendicular. At the same time the angled ions 802 are directed to the grating structure 602 to etch the underlayer 304 in a non-uniform manner, such as in a selective area processing operation, described above. Thus, after removal of the grating structure 602 in FIG. 8D, the resulting optical grating, shown as optical grating 806, exhibits a variable height, similar to the structure of FIG. 6D or FIG. 7C.

While the embodiments described above may entail the use of an underlayer such as silicon nitride to form an optical grating, in further embodiments of the disclosure, an optical grating may be formed within a silicon layer, such as monocrystalline silicon or polysilicon. Turning to FIG. 9A, there is shown a structure where the hard mask layer 306 is disposed on a silicon layer 902. In some embodiments, the silicon layer 902 may be disposed on a substrate base. At FIG. 9B, a grating structure 602 is formed on the silicon layer 902, where the grating structure 602 may be similar to the structures described above. To ensure high selectivity, in the case where hard mask layer 306 is silicon oxide, the etch chemistry for etching the hard mask layer 306, when disposed over silicon layer 902 may differ from the etch chemistry for etching the hard mask layer 306, when disposed over silicon nitride.

At FIG. 9C, angled ions 903 are directed to the grating structure 602, where the angled ions 903 are directed at a non-zero angle of incidence with respect to a perpendicular (Z-axis). As such, grating structures 904 are formed, being disposed at a non-zero angle of inclination with respect to the perpendicular. At the same time the angled ions 903 are directed to the grating structure 602 to etch the silicon layer 902 in a non-uniform manner, such as in a selective area processing operation, described above. As with the operation of FIG. 9B, the angled ions 903 may be provided in a reactive ion etching operation, where the chemistry of the reactive ion etching process may differ from a RIE chemistry used to form angled structures in silicon nitride, for example. After removal of the grating structure 602 in FIG. 9D, the resulting optical grating, shown as optical grating 906, exhibits a variable height, similar to the structure of FIG. 6D or FIG. 7C, while the grating structures 904 may differ in material (silicon) from the previous embodiments.

Turning to FIG. 10, there is shown a process flow 1000 according to various embodiments of the disclosure. At block 1002, a hard mask is formed over an underlayer, disposed on a substrate. The materials of the hard mask and underlayer may differ from one another. In one example, the underlayer is a material such as silicon nitride, while the hard mask is a silicon oxide material. The substrate may include a substrate base suitable for use in optical grating applications. For example, when used as an optical grating component to be applied directly to an eyepiece, the substrate may be optically transparent. When used as a master for forming optical gratings to be applied to an eyepiece, the substrate need not be optically transparent.

At block 1004, the hard mask layer is patterned to form a grating field. The grating field may have the dimensions within a plane of the substrate corresponding to the size and shape of an optical grating to be formed. For example, the optical grating field may have dimensions on the order of several millimeters to a few centimeters in X- and Y directions. In some embodiments, the optical grating field may be a lone window within the hard mask layer, while in other embodiments, the optical grating field may be formed with a pattern of sub-micrometer lines arranged in an array having an overall dimensions of millimeters to centimeters.

At block 1006, the underlayer is etched within the grating field, to form a variable height in the underlayer along a first direction within the plane of the substrate. For example, the underlayer may be etched so the height of the underlayer decreases monotonically along one direction parallel to the Y-axis, while the height of the underlayer remains uniform along the X-axis. According to different embodiments, the underlayer may be etched wherein the height varies linearly with distance along the Y-axis, or may vary in a non-linear fashion. In some embodiments, the underlayer may be etched in a non-uniform manner in an ion exposure by scanning the optical grating through a ribbon ion beam, where the ion exposure is arranged according to a selective area processing recipe. The selective area processing recipe may control parameters including the substrate scan speed, ion current, duty cycle of a pulsed ion beam, or a combination of parameters, to vary total ion dose delivered to different regions of the underlayer in the grating field as the substrate is scanned through the ribbon ion beam. In various embodiments the height of the underlayer after the ion exposure may vary between a maximum height of 1 micrometer or less and a minimum height of zero micrometers. As such, after the etching of the underlayer, the local angle defined by the surface of the underlayer with respect to horizontal (X-Y plane) may be less than 0.01 degrees and in some cases less than 0.001 degrees.

At block 1008, an optical grating is formed within the grating field using an angled ion etch. In various embodiments the angled ion etch may be performed using a suitable ion beam, including a ribbon ion beam. After the angled ion etch, the optical grating may include a plurality of angled structures, disposed at a non-zero angle of inclination with respect to a perpendicular (e.g., Z-axis) to the plane of the substrate (X-Y plane). In some embodiments, this range of non-zero angle of inclination may range up to 75 degrees, such as 10 degrees, 20 degrees, 30 degrees, 45 degrees, 60 degrees. The embodiments are not limited in this context. In various embodiments, the angled ion etch may be carried out using a grating pattern defined in a hard mask layer, where the grating pattern extends throughout the grating field. The angled ion etch may be carried out by scanning the grating pattern under (through) a ribbon ion beam. In some embodiments, the angled ion etch may also be controlled according to a selective area processing recipe to vary the ion dose imparted to different portions of the grating pattern, to match the local height of the optical grating layer being etched, such as the underlayer. The grating pattern may be arranged to generate the angled structures as an array of lines, where the lines define a sub-micrometer pitch, and where an individual line may extend for millimeters or centimeters across a length of grating field (e.g. along X-axis).

In various embodiments, the height of a line and the local depth of the optical grating along the X-axis may be uniform, while the plurality of angled structure define a variable height along a first direction (e.g., Y-axis). The variation in height or depth of the angled structures may be smooth, wherein variation in depth between successive angled structures is less than one nanometer, and in some cases less than 1 picometers, while a total variation in depth of the angled structures across the grating field may range up to 1 micrometer. As such, the variable depth of angled structures across the grating field may be based upon the variable height of the underlayer generated by the etch of the underlayer at block 1006.

In some embodiments, the variable depth of the angled structures may be defined by forming the angled structures directly within the variable-height underlayer. In other embodiments, the variable depth of the angled structures may be defined by forming the angled structures in a planarized backfill layer formed above the variable-height underlayer, where a variable depth is imparted into the planarized backfill layer by virtue of formation above the variable-height underlayer.

In accordance with different embodiments, the operations and block 1006 and block 1008 may be performed in any suitable order, including block 1006 first, block 1008 first, or block 1006 and block 1008 being performed simultaneously in one operation.

In sum, various embodiments described herein provide approaches for forming optical grating components including eyepieces for AR & VR, or masters for forming optical gratings for AR & VR eyepieces. One advantage of the present embodiments is the ability to perform the operations of non-uniform etching to generate a variable height of an optical grating as well as angled etching to form angled structures of the optical grating within a common tool. A related advantage is the flexibility afforded by various embodiments to perform operations of angled etching and non-uniform etching in any suitable sequence.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A method of forming an optical grating component, comprising:
   providing an underlayer atop a substrate;
   providing a hard mask layer atop the underlayer;
   patterning an opening in the hard mask layer;
   etching the underlayer through the opening of the hard mask layer to define a variable height of the underlayer along a first direction, the first direction being parallel to a plane defined by a top surface of the substrate;
   forming an etch stop layer over the underlayer after the underlayer is etched;
   forming a backfill material over the hard mask layer and over the etch stop layer;
   planarizing the backfill material selective to the hard mask layer, wherein a top surface of the backfill material over the etch stop layer is co-planar with the hard mask layer; and
   forming a plurality of angled structures in the backfill material using an angled ion etch delivered at a non-zero angle of inclination with respect to a perpendicular to the plane defined by the top surface of the substrate, wherein the plurality of angled structures define a variable depth along the first direction, based upon the variable height of the underlayer.

2. The method of claim 1, further comprising:
   forming a second hard mask layer atop the backfill material and the hard mask layer;
   patterning a set of openings in the second hard mask layer to define a plurality of grating structures; and
   directing an angled ion beam to the backfill material in the presence of the plurality of grating structures to form the plurality of angled structures.

3. The method of claim 2, further comprising removing the second hard mask layer after formation of the plurality of angled structures.

4. The method of claim 1, wherein forming the backfill layer comprises depositing a silicon nitride over the hard mask layer and over the etch stop layer.

5. The method of claim 1, further comprising depositing an oxide coating on the plurality of angled structures after the angled ion etch.

6. The method of claim 1, wherein forming the plurality of angled structures comprises forming a plurality of trenches in the backfill layer selective to the etch stop layer.

7. The method of claim 1, wherein etching the underlayer through the opening of the hard mask layer comprises recessing the underlayer to define a top surface of the underlayer having a constant slope relative to the plane of the substrate.

8. A method of forming an optical grating component, comprising:
   providing an underlayer atop a substrate;
   providing a hard mask layer atop the underlayer;
   patterning an opening in the hard mask layer;
   etching the underlayer through the opening of the hard mask layer to define a variable height of the underlayer along a first direction, the first direction being parallel to a plane defined by a top surface of the substrate;
   forming a backfill material over the hard mask layer and over an etch stop layer;
   planarizing the backfill material selective to the hard mask layer, wherein a top surface of the backfill material over the etch stop layer is co-planar with the hard mask layer; and
   forming a plurality of angled structures in the backfill material using an angled ion etch delivered to the backfill material at a non-zero angle of inclination with respect to a perpendicular to the plane defined by the top surface of the substrate, wherein the plurality of angled structures define a variable depth along the first direction, based upon the variable height of the underlayer.

9. The method of claim 8, further comprising forming an etch stop layer over the underlayer after the underlayer is etched.

10. The method of claim 9, wherein forming the backfill layer comprises depositing a silicon nitride over the hard mask layer and over the etch stop layer.

11. The method of claim 9, wherein forming the plurality of angled structures comprises forming a plurality of trenches in the backfill layer selective to the etch stop layer.

12. The method of claim 9, further comprising:
   forming a second hard mask layer atop the backfill material and the hard mask layer; and
   patterning a set of openings in the second hard mask layer to define a plurality of grating structures, wherein the angled ion etch comprises directing an angled ion beam to the backfill material in the presence of the plurality of grating structures.

13. The method of claim 12, further comprising removing the second hard mask layer after formation of the plurality of angled structures.

14. The method of claim 13, further comprising depositing an oxide coating on the plurality of angled structures after the second hard mask layer is removed.

15. The method of claim 8, wherein etching the underlayer through the opening of the hard mask layer comprises recessing the underlayer to define a top surface of the underlaying having a constant slope relative to the plane of the substrate.

\* \* \* \* \*